United States Patent Office.

LEWIS H. SPEAR, OF PEEKSKILL, NEW YORK.

Letters Patent No. 106,632, dated August 23, 1870.

IMPROVEMENT IN PRESERVING MEAT.

The Schedule referred to in these Letters Patent and making part of the same.

To all whom it may concern:

Be it known that I, LEWIS H. SPEAR, of Peekskill, county of Westchester and State of New York, have invented and discovered a new and improved Method of Treating Animal Substances which are to be cured for food; and I do hereby declare that the following is a full and exact description thereof.

The nature of my invention and discovery consists in perforating the membrane and fiber of meat so that the animal heat or gas and air can escape when the meat is placed in a vacuum-chamber, and the air exhausted therefrom. Also, in letting pickle into the chamber containing the meat, by suitable means, hereinafter described.

To accomplish the above, I take a suitable number of awl-shaped skewers, wedged-shaped at the point, from one-eighth to one-sixteenth of an inch in diameter, and of suitable length to pass through and perforate the meat, or other suitable means may be employed, by which the meat may be perforated; said instruments to be set in the form and manner hackle-teeth are set, one inch or less apart, and with suitable spiral springs around them to assist in removing them from the meat.

These skewers are forced through the meat, which is then hung in the vacuum-chamber, the air then being exhausted by means of an air-pump. Pickle or antiseptic gas is let into said chamber, by means of a tube or pipe and stop-cock, until the vacuum is filled.

The meat thus perforated does not puff when the air is exhausted therefrom, and when the pickle or gas is introduced into the vacuum-chamber it thoroughly permeates the meat through by means of the perforations above described.

Having thus fully described my said invention and discovery,

I claim as new and desire to secure by Letters Patent—

The process, herein described, for curing meat, the same consisting in perforating the flesh to be cured by suitable means, and subjecting it to the treatment in vacuo, as described.

LEWIS H. SPEAR.

Witnesses:
D. W. HINKLE,
JNO. H. HERNDON.